US012703196B2

(12) United States Patent
Almenar et al.

(10) Patent No.: US 12,703,196 B2
(45) Date of Patent: Aug. 11, 2026

(54) PRINTED SECURITY FEATURE

(71) Applicant: CCL Secure Pty Ltd, Craigieburn (AU)

(72) Inventors: Carlos Almenar, Craigieburn (AU); Justin Lawson, Craigieburn (AU); Nadeen Corbett, Craigieburn (AU)

(73) Assignee: CCL Secure Pty Ltd, Craigieburn (AU)

( * ) Notice: Subject to any disclaimer, the term of this patent is extended or adjusted under 35 U.S.C. 154(b) by 0 days.

(21) Appl. No.: 18/555,082

(22) PCT Filed: Apr. 14, 2022

(86) PCT No.: PCT/AU2022/050335
§ 371 (c)(1),
(2) Date: Oct. 12, 2023

(87) PCT Pub. No.: WO2022/217315
PCT Pub. Date: Oct. 20, 2022

(65) Prior Publication Data

US 2024/0198714 A1 Jun. 20, 2024

(30) Foreign Application Priority Data

Apr. 15, 2021 (AU) ................................ 2021901109

(51) Int. Cl.
*B42D 25/355* (2014.01)
*B41M 3/14* (2006.01)
(Continued)

(52) U.S. Cl.
CPC ............. *B42D 25/355* (2014.10); *B41M 3/14* (2013.01); *B42D 25/328* (2014.10); *B42D 25/373* (2014.10)

(58) Field of Classification Search
CPC .. B42D 25/355; B42D 25/373; B42D 25/328; B41M 3/14
(Continued)

(56) References Cited

U.S. PATENT DOCUMENTS

2006/0023132 A1 2/2006 Mengel et al.
2009/0127845 A1* 5/2009 Mallol ................ B42D 25/337 283/93
(Continued)

FOREIGN PATENT DOCUMENTS

AU 2011101065 A4 9/2011
CA 2687735 A1 12/2008
(Continued)

OTHER PUBLICATIONS

PCT International Search Report and Written Opinion, PCT/AU2022/050335, Jun. 2, 2022, 10 Pages.

*Primary Examiner* — Justin V Lewis
(74) *Attorney, Agent, or Firm* — Mintz, Levin, Cohn, Ferris, Glovsky and Popeo, P.C.

(57) ABSTRACT

A printed security feature for a security document including a substrate, the security feature comprising: a first functional effect ink printed on a first surface of the substrate, and a second functional effect ink printed on the first and/or a second surface of the substrate, at least partially overlapping the first functional effect ink, wherein the first and the second functional effect inks in combination create an imagery feature which resembles an appearance of a security thread.

21 Claims, 5 Drawing Sheets

(51) Int. Cl.
*B42D 25/328* (2014.01)
*B42D 25/373* (2014.01)

(58) Field of Classification Search
USPC .... 283/72, 87, 93, 94, 95, 98, 109, 110, 901
See application file for complete search history.

(56) References Cited

U.S. PATENT DOCUMENTS

| | | | | |
|---|---|---|---|---|
| 2012/0074684 | A1* | 3/2012 | Marchant | B42D 25/351 283/85 |
| 2014/0077485 | A1* | 3/2014 | Raksha | B44F 1/10 283/67 |
| 2016/0075164 | A1* | 3/2016 | Sarrazin | G03H 1/0011 283/94 |
| 2020/0171875 | A1* | 6/2020 | Jolic | B42D 25/378 |

FOREIGN PATENT DOCUMENTS

| | | | | |
|---|---|---|---|---|
| GB | 2464496 | A | 4/2010 | |
| GB | 2542786 | A | 4/2017 | |
| WO | 2007138293 | A2 | 12/2007 | |
| WO | WO-2019000049 | A1 * | 1/2019 | B41M 3/148 |
| WO | WO 2020/061631 | A1 | 4/2020 | |
| WO | WO 2020/107066 | A1 | 6/2020 | |

* cited by examiner

PRINTED SECURITY FEATURE

TECHNICAL FIELD

The present disclosure relates to a printed security feature. Embodiments of the invention can be used as a security device for security documents, for example, banknotes, credit cards, cheques, passports, identity cards and the like, and it will be convenient to describe the invention in relation to that exemplary, non-limiting application.

BACKGROUND OF INVENTION

It is well-known that many of the world's banknotes as well as other security documents include security devices which produce various visual effects enabling a visual authentication of security documents. For example, a security thread is often provided on a paper banknote, which comprises a thin ribbon that is embedded or partially embedded into the substrate material of the paper banknote, usually at the same time when the paper substrate is manufactured from raw materials such as pulp and fibres. Security threads are produced using a polymeric base layer on to which a combination of printed, deposited, or embossed layers are applied.

Despite being effective as a security feature, conventional security threads are generally formed in a linear shape, which typically consists of a narrow width, thereby providing a very limited surface area and imposing significant design constraints.

In more recent years, polymer based banknotes are gradually replacing conventional paper banknotes in many countries and regions. Similar to paper banknotes, it is also desirable to provide various security features on polymer banknotes to protect against counterfeiting. However, as polymer banknotes and paper banknotes are manufactured by entirely different methods from different source materials, security features provided on paper banknotes must be adapted if they are to be suitable for use on polymer surfaces. Unlike paper banknotes, it is generally inconvenient to embed a security thread in a substrate of a polymer banknote, and it is likely that doing so would require considerable time and effort which adds to the cost of manufacturing such banknotes. As a security thread is a well-known security feature widely implemented on paper banknotes, there is a need for a similar feature to be also provided on polymer banknotes and on other types of security documents, which is easily recognisable by the general public and does not significantly contribute to additional manufacturing costs. The present disclosure aims to alleviate one or more of the issues faced by conventional security threads, or to at least to provide an alternative security feature.

Any reference to or discussion of any document, act or item of knowledge in this specification is included solely for the purpose of providing a context for the present invention. It is not suggested or represented that any of these matters or any combination thereof formed at the priority date part of the common general knowledge, or was known to be relevant to an attempt to solve any problem with which this specification is concerned.

SUMMARY OF INVENTION

In a first aspect, the present invention provides a printed security feature for a security document including a substrate, the security feature comprising:

a first functional effect ink printed on a first surface of the substrate, and a second functional effect ink printed on the first and/or a second surface of the substrate, at least partially overlapping the first functional effect ink, wherein the first and the second functional effect inks in combination create an imagery appearance which resembles an appearance of a security thread.

In one embodiment, the security feature is of an elongate configuration which extends a substantial distance, or the entire distance between the first and the second edge of the security document, wherein the first and the second edges are parallel.

In one embodiment, the security feature is of an elongate configuration which extends between a first and a second edge of the security document.

In one embodiment, the elongate configuration has a length which is much greater than its width.

In one embodiment, the security feature is configured such that it displays a glossy, or a brighter visual appearance in some regions, and a less glossy, or a duller visual appearance in other regions, to resemble the appearance of a security thread which is at least partially embedded in the substate.

In one embodiment, the security feature displays a repetitive pattern of images, icons, numbers, texts, and similar thereof.

In one embodiment, the first functional effect ink is printed as a solid strip, and the second functional effect ink is printed as recognisable patterns.

In one embodiment, the second functional effect ink is printed within boundaries of the solid strip formed by the first functional effect ink, that is, the recognisable patterns are printed such that they substantially overlap with the strip formed by the first functional effect ink.

In another embodiment, the second functional effect ink is printed such that it extends beyond boundaries of the solid strip formed by the first functional effect ink. In this embodiment, portions of the second functional effect ink which extend beyond the boundaries of the solid strip may be configured as a shadow image visible in transmission.

In another embodiment, the second functional effect ink is printed such that it appears as shadow image visible in transmission and from both sides of the security document.

In one embodiment, the first functional effect ink is printed to form a background of the security feature.

In one embodiment, the first functional effect ink and the second functional effect ink include a colour switching ink, which displays a variable colour appearance when a viewing condition changes.

In one embodiment, the first functional effect ink and the second functional effect ink include a colour switching ink, which displays a variable colour appearance as a viewing angle changes.

In one embodiment, the first functional effect ink and the second functional effect ink include an ink comprising metallic ink particles, which create a metallic appearance.

In other embodiments, the first and second functional effect inks may include fluorescent, luminescent, phosphorescent inks, photochromic, thermochromic, hydrochromic, or peizochromic inks.

In one embodiment, one of the first and second functional effect inks is a colour switching ink, and the other one of the first and second functional effect inks is a metallic ink.

In preferred embodiments, a non-functional effect ink is also printed on the substrate in one or more ink layers, and on one or both surfaces of the substrate.

In one embodiment, the non-functional effect ink is printed to coat a major area of the first and second surfaces of the substrate, to produce a suitable printing surface for subsequent security features applied to the substrate.

In one embodiment, the non-functional effect ink is omitted in one or more regions where the first and the second functional effect inks have already been applied, such that the security feature is exposed in the one or more regions.

In one embodiment, in the one or more regions where the non-functional effect ink is omitted, one or more half-windows are created due to the non-functional effect ink being absent in the regions.

In one embodiment, the one or more half-windows include a plurality of uniformly spaced and substantially similar shape half-windows.

In one embodiment, within the one or more regions, the security feature displays a glossy surface appearance, and effects of the first and second functional effect inks are perceivable to an observer through the one or more regions where the non-functional effect ink is omitted.

In one embodiment, outside the one or more regions, the security feature displays a dull, and/or a matt appearance, and effects of the first and second functional effect inks are partially concealed by the non-functional effect ink.

In one embodiment, the glossy appearance and the matt appearance of the security feature are more easily distinguishable from each other from predetermined viewing angles.

In one embodiment, the glossy appearance and the matt appearance of the security feature are more easily distinguishable from each other at oblique viewings, and when the security feature is viewed in reflection.

In one embodiment, the glossy appearance and the matt appearance of the security feature are less distinguishable from each other at other viewing angles, such as from non-oblique viewings, or when the security feature is viewed in transmission.

In a preferred embodiment, the first and the functional effect inks are both printed on the first surface of the substrate, and the non-functional effect ink is also applied on the first surface of the substrate to form one or more half-windows.

In one embodiment, the non-functional effect ink is printed onto the second surface of the substrate in a plurality of ink coating layers.

In one embodiment, the non-functional effect ink is applied in one or more ink coating layers, to form a shadow image visible from the second surface of the substrate.

In one embodiment, the security feature displays its glossy and matt appearances when viewed from the first surface of the substrate, and a shadow image when viewed from the second surface of the substrate, wherein the shadow image is observable in reflection, but becomes less observable, or visually indistinguishable in transmission.

In one embodiment, the shadow image is formed as a negative shadow image, that is, the non-functional effect ink is omitted in accordance with a design of the shadow image. In another embodiment, the shadow image is formed as a positive shadow image, that is, the non-functional effect ink is printed such that more ink is deposited in areas where the positive shadow image is formed, either by printing additional layers of the non-functional effect ink, or by depositing a higher amount of the non-functional effect ink by adjusting parameters of a printing apparatus.

In one embodiment, one or both of the first and the functional effect inks also form a background of the shadow image.

In one embodiment, the non-functional effect ink is an opacifying ink which is of a substantially uniform colour appearance.

In one embodiment, the non-functional effect ink is an opacifying ink which is semi-transparent, or semi-opaque.

In one embodiment, the substrate is a transparent or translucent substrate made from a polymeric material.

In one embodiment, the security document is a polymeric banknote substrate.

In one embodiment, the strip of the first functional effect ink is printed uniformly in an area, transversely across a width of the substrate.

In one embodiment, the security feature has a width of approximately 2 mm to 12 mm, and more preferably it has a width of approximately 5 mm to 10 mm.

In one embodiment, the first and second functional effect ink, and the non-functional effect ink are all applied in an in-line printing process on the same printing apparatus. In one embodiment, the printing apparatus is a gravure printing apparatus including a plurality of printing units, each printing unit arranged to apply a layer of ink before the next layer of ink is applied.

In one embodiment, the substrate of the security document is part of a transparent web of material, which is transported by the printing apparatus as different parts of the web of material are printed by the printing units.

In a second aspect, the present invention provides a printed security feature for a security document including a substrate, the security feature comprising:

- a first functional effect ink printed on a first surface of the substrate,
- a second functional effect ink printed on the first and/or a second surface of the substrate, at least partially overlapping the first functional effect ink, and
- a non-functional effect ink printed in one or more ink layers to create a shadow image which is observable in reflection.

In one embodiment, the first and second functional effect inks in combination create an imagery appearance which resembles an appearance of a security thread.

In one embodiment, the security feature is of an elongate configuration which extends a substantial distance, or the entire distance between the first and the second edge of the security document, wherein the first and the second edges are parallel.

In one embodiment, the security feature is of an elongate configuration which extends between a first and a second edge of the security document.

In one embodiment, the elongate configuration has a length which is much greater than its width.

In one embodiment, the security feature is configured such that it displays a glossy, or a brighter visual appearance in some regions, and a less glossy, or a duller visual appearance in other regions, to resemble the appearance of a security thread which is at least partially embedded in the substate.

In one embodiment, the security feature displays a repetitive pattern of images, icons, numbers, texts, and similar thereof.

In one embodiment, the shadow image is more visible in reflection than in transmission, or only visible in reflection.

In one embodiment, the first functional effect ink is printed as a solid strip, and the second functional effect ink is printed as recognisable patterns.

In one embodiment, the second functional effect ink is printed such that it appears as a second shadow image visible in transmission and visible from both sides of the security document.

In one embodiment, the second functional effect ink is printed within boundaries of the solid strip formed by the first functional effect ink, that is, the recognisable patterns are printed such that they substantially overlap with the first functional effect ink.

In another embodiment, the second functional effect ink is printed such that it extends beyond boundaries of the solid strip formed by the first functional effect ink.

In one embodiment, the first functional effect ink is printed to form a background of the security feature.

In one embodiment, the first functional effect ink and the second functional effect ink include a colour switching ink, which displays a variable colour appearance when a viewing condition changes.

In one embodiment, the first functional effect ink and the second functional effect ink include a colour switching ink, which displays a variable colour appearance as a viewing angle changes.

In one embodiment, the first functional effect ink and the second functional effect ink include an ink comprising metallic ink particles, which create a metallic appearance.

In other embodiments, the first and second functional effect inks may include fluorescent, luminescent, phosphorescent inks, photochromic, thermochromic, hydrochromic, or peizochromic inks.

In one embodiment, one of the first and second functional effect inks is a colour switching ink, and the other one of the first and second functional effect inks is a metallic ink.

In preferred embodiments, a non-functional effect ink is also printed on the substrate in one or more ink layers, and on one or both surfaces of the substrate.

In one embodiment, the non-functional effect ink is printed to coat a major area of the first and second surfaces of the substrate, to produce a suitable printing surface for subsequent security features applied to the substrate.

In one embodiment, the non-functional effect ink is omitted in one or more regions where the first and the second functional effect ink have already been applied.

In one embodiment, in the one or more regions where the non-functional effect ink is omitted, one or more half-windows are created due to the non-functional effect ink being absent in the regions.

In one embodiment, the one or more half-windows include a plurality of uniformly spaced and substantially similar shaped half-windows.

In one embodiment, within the one or more regions, the security feature displays a glossy surface appearance, and effects of the first and second functional effect inks are perceivable to an observer through the one or more regions where the non-functional effect ink is omitted.

In one embodiment, outside the one or more regions, the security feature displays a matt appearance, and effects of the first and second functional effect inks are partially concealed by the non-functional effect ink.

In one embodiment, the glossy appearance and the matt appearance of the security feature are more easily distinguishable from each other from predetermined viewing angles.

In one embodiment, the glossy appearance and the matt appearance of the security feature are more easily distinguishable from each other at oblique viewings, and when the security feature is viewed in reflection.

In one embodiment, the glossy appearance and the matt appearance of the security feature are less distinguishable from each other at other viewing angles, such as from non-oblique viewings, or when the security feature is viewed in transmission.

In a preferred embodiment, the first and the functional effect inks are both printed on the first surface of the substrate, and the non-functional effect ink is also applied on the first surface of the substrate to form one or more half-windows.

In one embodiment, the non-functional effect ink is printed onto the second surface of the substrate in a plurality of ink coating layers.

In one embodiment, the shadow image is formed as a negative shadow image, that is, the non-functional effect ink is omitted in accordance with a design of the shadow image. In another embodiment, the shadow image is formed as a positive shadow image, that is, the non-functional effect ink is printed such that more ink is deposited in areas where the positive shadow image is formed, either by printing additional layers of the non-functional effect ink, or by depositing a higher amount of the non-functional effect ink by adjusting parameters of a printing apparatus.

In one embodiment, one of the first and the functional effect inks also forms a background of the shadow image.

In one embodiment, the non-functional effect ink is an opacifying ink which is of a substantially uniform colour appearance.

In one embodiment, the non-functional effect ink is an opacifying ink which is semi-transparent, or semi-opaque.

In one embodiment, the substrate is a transparent or translucent substrate made from a polymeric material.

In one embodiment, the security document is a polymeric banknote substrate.

In one embodiment, the strip of the first functional effect ink is printed uniformly in an area, transversely across a width of the substrate.

In one embodiment, the security feature has a width of approximately 2 mm to 12 mm, and more preferably it has a width of approximately 5 mm to 10 mm.

In one embodiment, the first and second functional effect ink, and the non-functional effect ink are all applied in an in-line printing process on the same printing apparatus. In one embodiment, the printing apparatus is a gravure printing apparatus including a plurality of printing units, each printing unit arranged to apply a layer of ink before the next layer of ink is applied.

In one embodiment, the substrate of the security document is part of a transparent web of material, which is transported by the printing apparatus as different parts of the web of material are printed by the printing units.

Definitions

Security Document or Token

As used herein, the terms security documents and tokens include all types of documents and tokens of value and identification documents including, but not limited to the following: items of currency such as bank notes and coins, credit cards, cheques, passports, identity cards, securities and share certificates, driver's licences, deeds of title, travel documents such as airline and train tickets, entrance cards and tickets, birth, death and marriage certificates, and academic transcripts.

The invention is particularly, but not exclusively, applicable to security documents or tokens such as bank notes or identification documents such as Identity cards or passports formed from a substrate to which one or more layers of printing are applied.

Security Device or Feature

As used herein, the term security device or feature includes any one of a large number of security devices, elements or features intending to protect security document or token from counterfeiting, copying, alteration or tampering.

Substrate

As used herein, the term substrate refers to the base material from which the security document or token is formed. The base material may be paper or other fibrous materials such as cellulous; a plastic or polymeric material including but not limited to polypropylene (PP), polyethylene (PE), polycarbonate (PC), polyvinyl chloride (PVC), polyethylene terephthalate (PET), biaxially-oriented polypropylene (BOPP); or a composite material of two or more materials, such as a laminate of paper and at least one plastic material, or of two or more polymeric materials.

The use of plastic or polymeric materials in the manufacture of security documents pioneered in Australia has been very successful because polymeric banknotes are more durable than their paper counterparts and can also incorporate new security features (such as micro-optic devices).

In preferred embodiments, the substrate is a transparent or translucent material. Transparent substrates are particularly preferred as micro-imagery elements produced on one surface of the substrate may then be viewed through an array of focusing elements disposed on the opposite surface of the substrate. The thickness of the transparent substrate is preferably above 25 μm. In some embodiments, the substrate is from 60 to 100 μm thick, preferably from 65 to 90 μm thick.

A particularly suitable transparent substrate is polypropylene and in particular biaxially oriented polypropylene.

Transparent Windows and Half Windows

As used herein, the term window refers to a transparent or translucent area in the security document compared to the opaque region to which printing is applied. The window maybe fully transparent so as to allow the transmission of light substantially unaffected, or it may be partly transparent or translucent, partly allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting at least one opacifying layer in the region forming the window area. If opacifying layers are applied to both sides of a transparent substrate, a fully transparent window may be formed by omitting the opacifying layers on both sides of the transparent substrate in the window area.

A partly transparent or translucent area herein after referred to as a “half-window”, may be formed in a polymeric security document which has opacifying layers on both sides by omitting the opacifying layers on one side only of the security document in the window area so that “half-window” is not fully transparent but allows sunlight to pass through without allowing objects to be viewed clearly through the half-window.

Alternatively, it is possible for the substrates to be formed from a substantially opaque material, such as paper or fibrous material, without an insert of transparent plastics material inserted into a cut out or recessed into the paper or fibrous substrate to form a transparent window or a translucent half-window area.

Opacifying Layers

One or more opacifying layers may be applied to a transparent substrate to increase the opacity of the security document. An opacifying layer is such that $L_T<L_0$ where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Functional Effect Ink

As used herein, the term “functional effect ink” refers to an ink which is able to create a visual effect which is different from a plain coloured or non-coloured ink. The visual effect may include: colour shifting, producing a metallic shimmer, creating a specific surface texture, providing visibility only under certain conditions (e.g. photochromic, UV, IR inks), and similar thereof.

Shadow Image

As used herein, the term “shadow image” refers to an imagery feature which is created through introducing an opacity variance in an imagery region of the shadow image.

BRIEF DESCRIPTION OF DRAWINGS

Preferred embodiments of the invention will now described by way of example with reference to the accompanying drawings in which.

DETAILED DESCRIPTION

Figure 4:
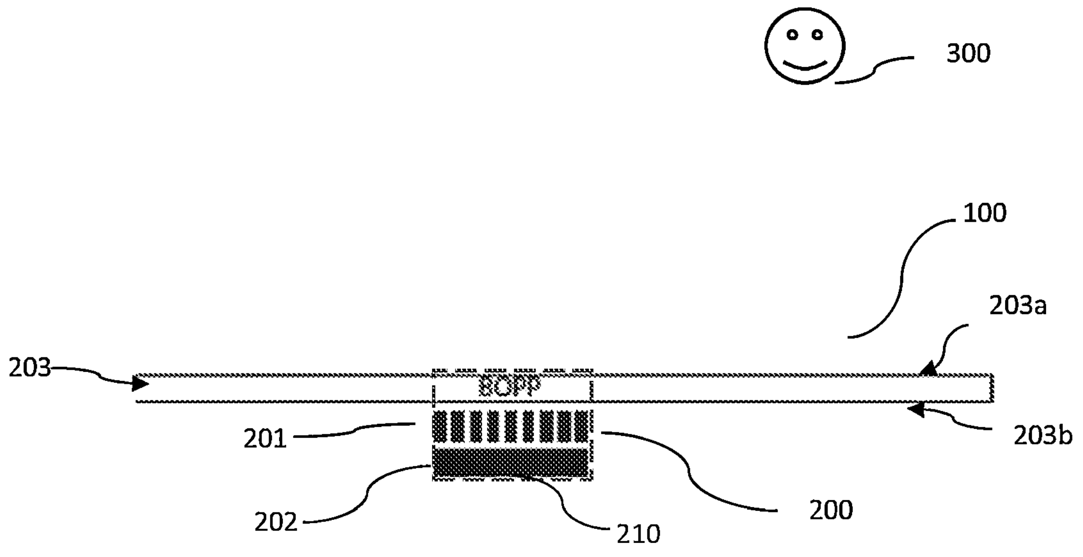
FIG. 4 shows a schematic diagram of a security document comprising a printed security feature in accordance with one embodiment of the present disclosure.
Figure 5:
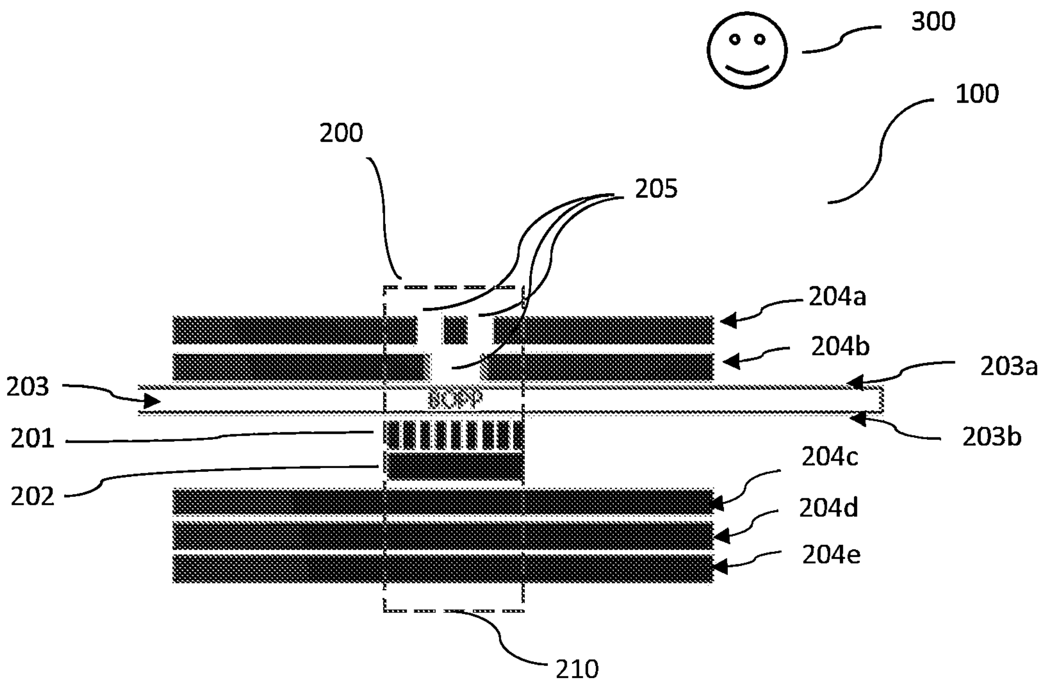
FIG. 5 shows a schematic diagram of a security document with a printed security feature in accordance with another embodiment of the present disclosure.
Figure 6:
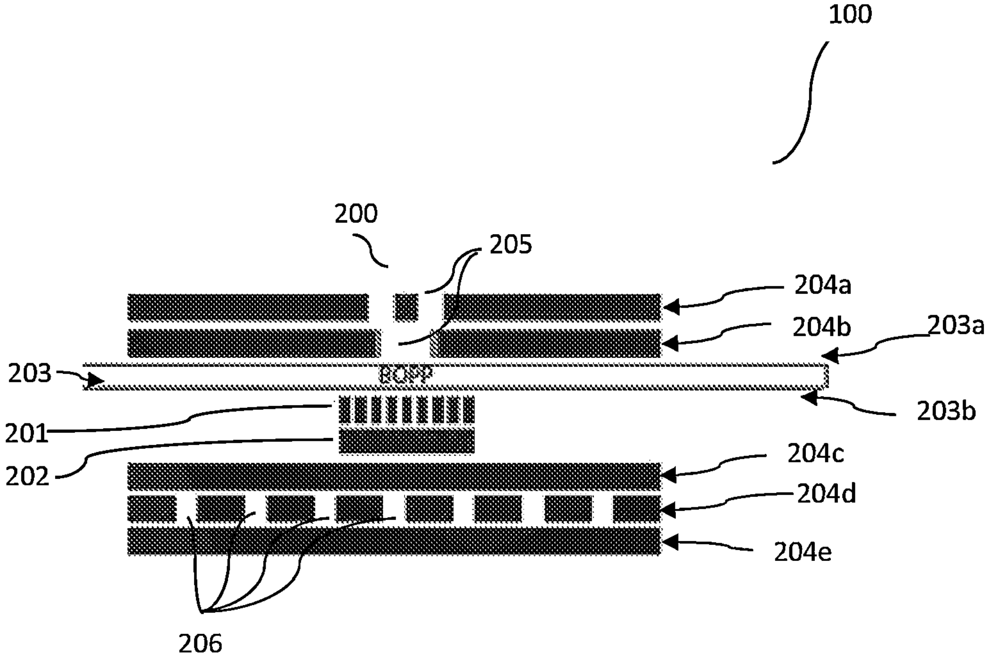
FIG. 6 shows a schematic diagram of a security document with a printed security feature in accordance with yet another embodiment of the present disclosure.

Examples of various visual effects provided by different embodiments of a printed security feature 200 of the present disclosure will now be described with reference to FIGS. 1*a*, 1*b*, 2 and 3. Constructions of a printed security feature 200 which are able to generate such visual effects are illustrated in FIGS. 4 to 6.

In one embodiment, the printed security feature 200 is configured such that it generates an imagery appearance which is similar to that of a conventional foil thread, at least when viewed from one side of a supporting substrate. However, in preferred embodiments, a more complex, dynamic visual appearance and authentication feature is provided by the present security feature 200, as detailed further below. The security feature 200 as disclosed herein is able to be manufactured entirely on a printing apparatus, through sequential printing steps, which eliminates the requirement of additional embedding steps which are generally required when incorporating conventional foil threads in paper based security documents.

Figure 1A:
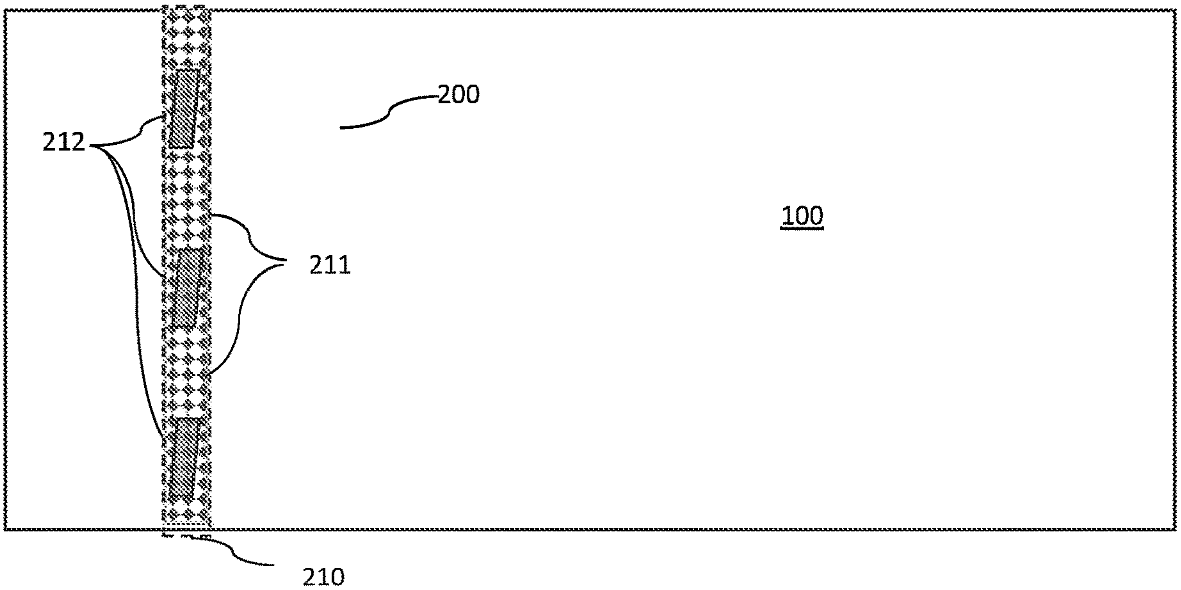
FIG. 1*a* is a front view of a printed security feature applied as a security device on a security document, in accordance with a first embodiment of the present disclosure.

FIG. 1*a* is a front view of a security feature 200 applied on a substrate of a security document 100, in accordance with one embodiment of the present disclosure. The security feature 200 is configured in the shape of an elongate strip which extends transversely across a width of the security document 100. Preferably, the security feature 200 is arranged to extend a substantial, or the entire width of the security document 100. The width of the security feature is around 3 mm to 12 mm, or more preferably around 5 mm to 10 mm. Although in FIGS. 1*a* and 1*b* the security feature 200 is substantially linear and extends straight from a top edge to a bottom edge of the security document 100, it should be appreciated that in other embodiments, the security feature 200 can have elements which extend outwardly from the security feature 200, and the security feature 200 is not restricted to a linear shape.

With reference to FIG. 1*a*, when viewed from a first side of the security document in reflection, the security feature 200 displays a dynamic, optically variable visual appearance. For example, the colour appearance of the security feature 200 changes as the viewing angle changes.

Figure 1B:
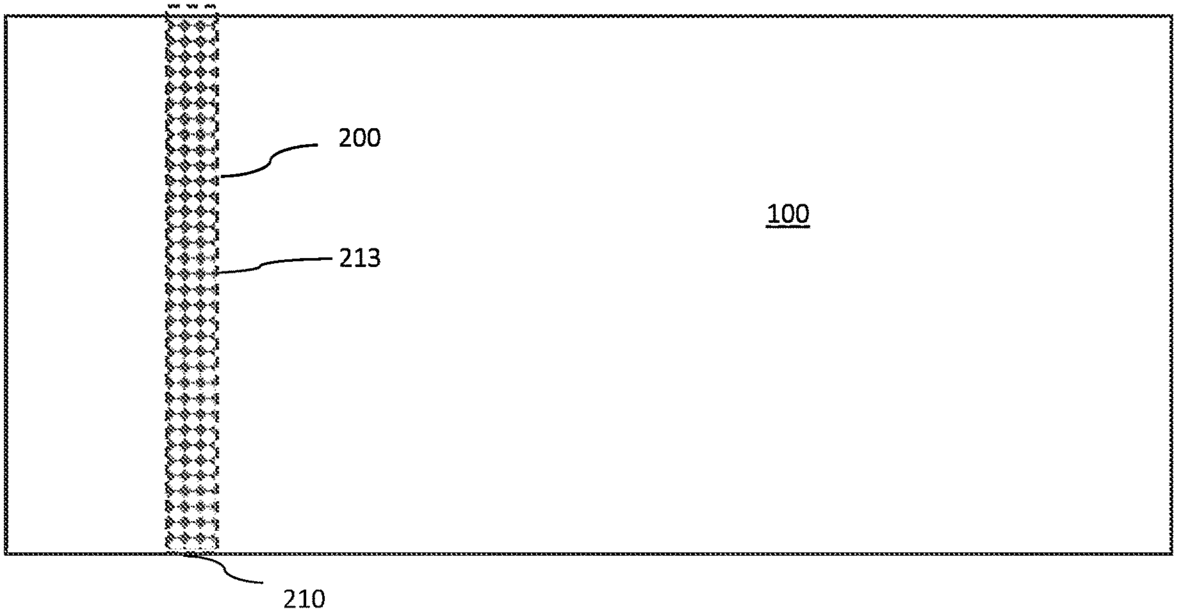
FIG. 1*b* is shows a transmitted view of the security feature of FIG. 1*a;*

In another embodiment, the security feature 200 may be configured to additionally provide a visible change of a perceived surface texture of the security document. By “perceived surface texture” it is meant that the security feature 200 displays a change from a glossy surface appearance to a more matt appearance, or vice versa, as the viewing angle changes. For example, in FIG. 1*a*, portions 211 of the security feature display a more glossy appearance, whereas portions 212 of the security feature 200 display a more matt appearance. As the viewing angle changes, the difference between the matt and glossy appearances of the security feature 200 may become less apparent. FIG. 1*b* depicts a transmitted view of the security feature 200 of FIG. 1*a*. When the security feature 200 is viewed in transmission, from the first surface of the security document 100, the matt and glossy appearances of the security feature 200 are less visible, and the security feature 200 generates a more uniform imagery appearance 213 as indicated in FIG. 1*b*.

Figure 2:
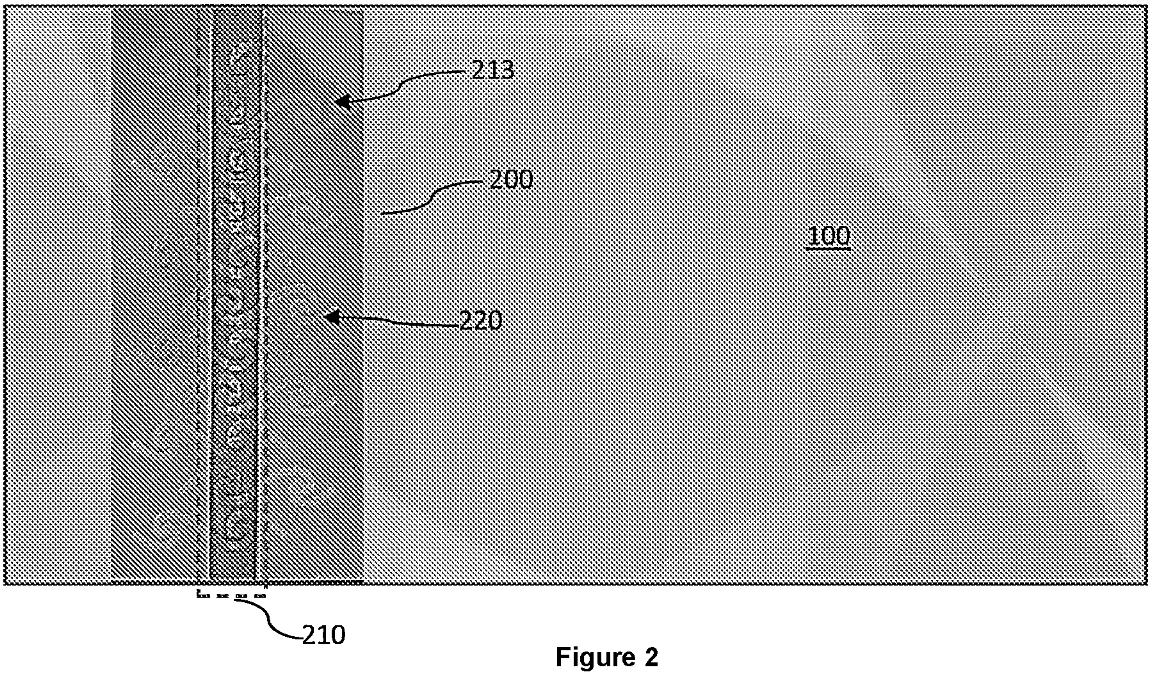
FIG. 2 depicts a transmitted view of a security feature applied as a security device on a security document, in accordance with another embodiment of the present disclosure.

In another embodiment, in addition to the visual effects mentioned above, the security feature 200 is configured to provide a shadow image 220 when the security feature 200 is viewed in transmission, such as that shown in FIG. 2. Depending on the construction of the security feature 200, this shadow image 220 can be configured to be visible in transmission from both sides of the security document 100, or it may be only visible from one side of the security document 100. As seen, the shadow image 220 may be configured to extend beyond boundaries 210 of the security feature 200, thus not being limited by the narrow width of the security feature 200, and allowing more information content or more complex imagery to be embedded in the feature.

Figure 3:
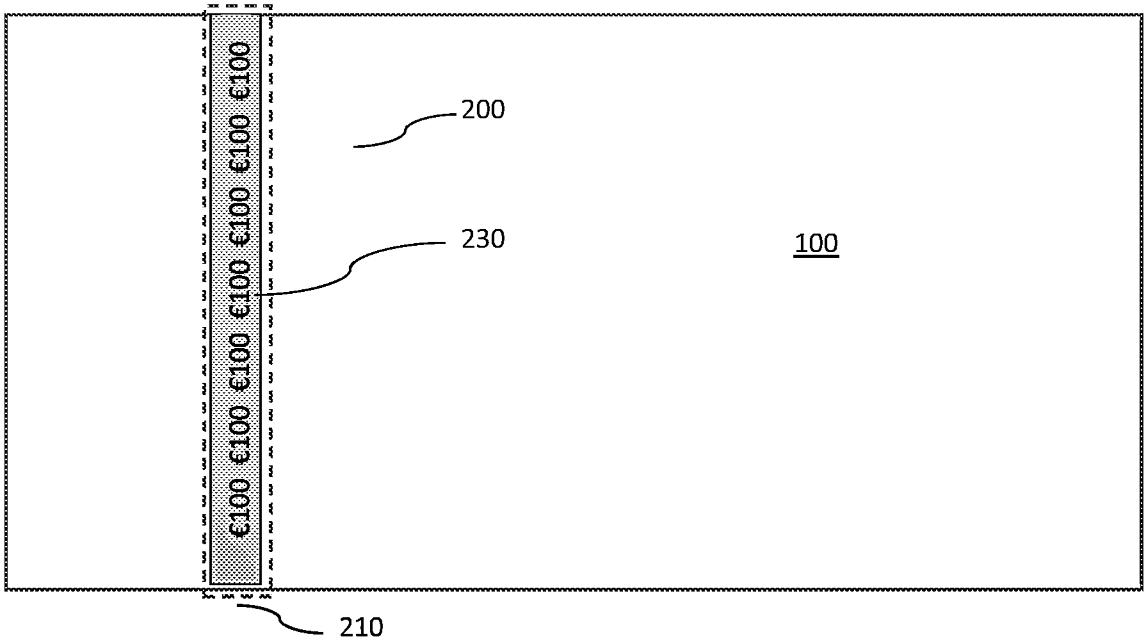
FIG. 3 shows a reflected view of a printed security feature, in accordance with another embodiment of the present disclosure.

In an alternative embodiment, and in addition to or as an alternative to the visual effects mentioned above, the security feature 200 is configured to provide a shadow image 230 which is visible when the security feature 200 is viewed in reflection, from a second side of the security document 100, such as that shown in FIG. 3. Preferably, the shadow image 230 is only visible, or more visually perceivable, when viewed in reflection, and becomes less apparent, or disappears completely when the thread 200 is viewed in transmission, from either side of the security document 100. Although not illustrated in FIGS. 2 and 3, it will be appreciated that the shadow images 220 and 230 can be formed as multi-tonal shadow images, displaying a tonal variation across its imagery appearance.

This embodiment, in which the security feature 200 includes a shadow image 230 which is visible in reflection and is less apparent, or disappears completely in transmission, is particularly unusual. Shadow images or watermarks are security features which are known to be more visible in transmission than reflection, whereas this shadow image provides the opposite effect being more visible in reflection. To that end, a security feature according to this embodiment may be employed with greater design freedom than other embodiments described herein and, in particular, does not require to resemble or simulate a security thread or be elongate in nature. This particular embodiment could, for example, be applied as a security feature patch.

Although a limited number of visual effects are shown as exemplary embodiments in FIGS. 1*a* to 3, it should be appreciated that various combinations of the colour switching effect, perceived surface texture change effect, and different types of shadow images as described above can be used in different combinations, to produce a desirable security feature that provides a suitable level of authentication.

Details of how various embodiments of the printed security feature 200 are manufactured will now be described with references to FIGS. 4 to 6.

FIG. 4 shows a cross-sectional schematic diagram of a security document 100 including a security feature 200, in accordance with a first embodiment of the present disclosure. The security document 100 includes a substrate 203, onto which the printed security feature 200 is applied. It will be appreciated that the substrate 203 can be made from any material appropriate for use as security substrates, such as plastic or polymeric material including but not limited to polypropylene (PP), polyethylene (PE), polycarbonate (PC), polyvinyl chloride (PVC), polyethylene terephthalate (PET), or a composite material of two or more materials, such as a laminate of paper and at least one plastic material, or of two or more polymeric materials. In this embodiment, the substrate 203 is made from biaxially-oriented polypropylene, also known as BOPP.

In the embodiment shown in FIG. 4, the printed security feature 200 includes a first functional effect ink 201 applied to a lower surface 203*b* of the substrate 203, and a second functional effect ink 202 which at least partially overlaps with the first functional effect ink 201. The first functional effect ink 201 and the second functional effect ink 202 may be both applied to the same surface of the substrate 203 as shown in FIG. 4, or alternatively, they may be applied to opposite surfaces of the substrate 203, and take advantage of the transparent or translucent nature of the substrate 203, to allow additive colour mixing of the first and second functional effect inks.

In this embodiment, the first functional effect ink 201 is printed to form recognisable patterns, whereas the second functional effect ink 202 is printed in a more uniform manner and forms a solid strip which determines boundaries 210 of the security feature 210. Preferably, the solid strip serves as a background for the recognisable patterns formed by the first functional effect ink 201. The first and second functional effect inks 201 and 202 can be of different types, or they can be the same type of ink but depicts a different colour appearance. The first functional effect ink 201 may be a colour shifting ink, which displays a colour change when viewed at different angles. The second functional effect ink could be a metallic colour ink, to better simulate the appearance of a foil thread. Preferably, the security feature 200 generates a glossy surface appearance when viewed from the position of viewer 300.

FIG. 5 shows anther embodiment of a printed security feature 200, which is configured to additionally display a change in a perceived surface texture of the security document 100 as discussed above. Similar to the embodiment show in FIG. 4, a first and a second functional effect ink 201 and 202 are again applied to a lower surface 203*b* of a substantially transparent substrate 203. However, the security feature 200 also comprises additional ink layers 204*a, b, c, d, e* of a non-functional effect ink, in order to create a more complex security feature 200.

On a top surface 203*a* of the substrate 203, two ink coating layers 204*a*, 204*b* of the non-functional effect ink are printed. These two layers are each omitted in selected regions which are indicated by different sized gaps 205, which effectively form one or more half windows for the security substrate 100. Layers 204*a* and 204*b* at least partially overlap with the first and second functional effect inks 201 and 202, in order to create the change in perceived surface texture of the security feature 200. On the bottom surface 203*b* of the substrate 203, three layers 204*c*, 204*d*, 204*e* of non-functional effect ink are applied. Preferably, the non-functional effect ink layers are printed to cover a major area of substrate 203, in order to create a suitable printing surface for subsequent security features which are applied to the security document 100.

When the security feature 200 of FIG. 5 is viewed in reflection, from the top surface 203*a* of the substrate 203 and from viewer position 300, an imagery appearance such as the one illustrated in FIG. 1 will be observed. As the non-functional effect ink is printed to overlap partially with first and second functional effect ink 201 and 202 within the boundaries 210, some portions of the first and second functional effect inks 201 and 202 are viewed directly through the substrate 203, whereas other portions of the first and second functional effect inks 201 and 202 are viewed through the non-functional effect ink layers 204*a* and 204*b*. When the functional effect inks are viewed through the non-functional effect ink layers, a dull, matt appearance will be observed, whereas when the functional effect ink layers are viewed directly through the transparent substrate 203, via gaps 205, the security feature 200 displays a more glossy surface appearance, and any special effects contributed by the functional effect inks 201 and 202 will be clearly visible. In this way, the same security feature 200 can be configured such that it appears to have different surface texture at different viewing angles.

In one embodiment, the non-functional effect ink is an opacifying ink, which is typically of a light colour, for example, white, grey, or a tinted blue colour appearance, and is semi-transparent after applied to a printing surface. When the embodiment of FIG. 5 is viewed in transmission, as the non-functional effect ink is semi-transparent, recognisable patterns formed by the first functional effect ink 201 will still be visible, and the difference between matt and glossy appearance of different portions of the thread will become less apparent, such as that shown in FIG. 1*b*.

It will be appreciated that printing the non-functional effect ink layers such that they partially overlap with the functional effect ink layers provides further advantages, in addition to its visual appeal. When printing a plurality of ink layers in an in-line printing process, each printed ink layer is subject to a certain printing tolerance. As more and more ink layers are applied, it becomes more difficult to accurately register all the printed ink layers such that they appear identical from one security substrate to another. For example, with the embodiment shown in FIG. 4, although the first and second functional effect ink layers 201 and 202 are shown as in perfect registration with each other, that is, the edges of these two inks are perfectly aligned, in practice it is often the case that the two ink layers are not in perfect registration, thus causing spoilage or causing an inconsistent imagery appearance. The overlapping non-functional effect ink layers 204*a, b, c, d, e* can help to alleviate such issues, as they are printed to overlap edges of the first and second functional effect inks 201 and 202, thus any potential misregistration between the functional effect ink layers will be concealed. Secondly, as the non-functional effect ink layers can be the same as opacifying ink layers which are applied as base layers before subsequent security features are formed, the manufacturing of the security feature 200 forms part of the initial printing process for the security document, thereby avoiding the need to increase the number of printing steps, which can then lead to an increase in manufacturing costs of the security substrate 100.

In a further embodiment, the non-functional effect ink layers are configured such that they include gaps both on the top surface 203*a* and bottom surface 203*b* of the substate 203, to make the security feature even more visually appealing and complex. For example, the non-functional effect ink layers can be configured to further create a shadow image which is visible in reflection, and when the security feature is viewed from a lower surface of the security document 100. This embodiment is illustrated in FIG. 6.

In this embodiment, non-functional effect ink layer 204*d* is printed in accordance with a negative shadow image, that is, the ink layer 204*d* is selectively omitted in accordance with a desired shadow image pattern, as indicated by gaps 206. Alternatively, the non-functional effect ink layers provided on the bottom surface 203*b* of the substrate 203 can be configured to form a positive shadow image, that is, a heavier ink loading, or more layers of non-functional effect ink are printed in accordance with a positive shadow image pattern. Thus, the visual appearance of the security feature 200 is made more complex and different to counterfeit by the inclusion of the shadow image, as well as the colour shifting effects of the functional effect ink layers 201 and 202, and a change in the perceived surface texture of the security document 100. It should be appreciated that non-functional effect layers 204*c*, or 204*e*, or any combination of the non-functional effect ink layers 204*c*-204*e* can also be configured to form a desired shadow image pattern. In addition, a multi-tonal shadow image can be formed by the combination of layers 204*c* to 204*e*, if each of the layers is printed in accordance with a portion of an overall tonal image. For example, different sized gaps can be provided in layers 204*c* to 204*e*, such that the combined opacity of the layers 204*c* to 204*e* varies across an imagery region, and resulting in a tonal variation in the shadow image.

The shadow image formed on the lower surface 203*b* is preferably only visible in reflection, and disappears in transmission. This is a particular striking effect as existing shadow images are often produced such that they are clearly visible in transmission, but generally difficult to see when viewed in reflection. In addition, the functional effect ink layers 201 and 202 can form a coloured, or a patterned background for the shadow image, again increasing the difficulty to counterfeit such features. In addition, as the shadow image disappears in transmission, the recognisable patterns formed by the functional effect ink 201 then becomes visible.

The security feature 200 of the present disclosure comprises printed layers of functional effect inks and non-functional effect inks, which resembles the appearance of a security thread in some embodiments, but is also able to provide more complex and striking visual effects as described above. These types of visual effects were not achievable or considered very difficult to achieve by conventional foil threads.

In one embodiment, all of the functional and non-functional effect ink layers are printed onto the substrate by an in-line printing apparatus, for example, a gravure printing apparatus including a plurality of printing units each arranged to print a layer of ink onto a printing medium, such as a web of substrate film, as it moves past the plurality of printing units. This eliminates the embedding process which is typically required when incorporating conventional foil threads into paper bank notes.

Further, the non-functional effect ink layers not only form part of the security feature, but also form a suitable printing surface for subsequently applied security features in some cases. This means the security feature of the present disclosure is effectively formed as a substrate feature, and can thus be manufactured by substrate manufacturers, instead of requiring banknote printers to apply this security feature after a security substrate has already been made, thereby streamlining the process of manufacturing.

Where any or all of the terms “comprise”, “comprises”, “comprised” or “comprising” are used in this specification (including the claims) they are to be interpreted as specifying the presence of the stated features, integers, steps or components, but not precluding the presence of one or more other features, integers, steps or components.

It would be understood that the invention is not limited to the specific embodiments described herein, which are provided by way of example only. Scope of the invention is as defined by the claims appended hereto.

The invention claimed is:

1. A printed security feature for a security document, said security document including a transparent or translucent substrate of polymeric material, the security feature comprising:

- a first functional effect ink printed directly onto a first surface of the substrate, and
- a second functional effect ink printed directly onto the first and/or a second surface of the substrate, at least partially overlapping the first functional effect ink,
- wherein the first and the second functional effect inks in combination create an imagery appearance of a security thread that is an elongate strip having a length that is greater than its width and extends between a first edge and a second edge of the security document,
- wherein at least one of the first functional effect ink and the second functional effect ink includes a colour switching ink, which displays a variable colour appearance when a viewing condition and/or a viewing angle changes, or
- wherein at least one of the first functional effect ink and the second functional effect ink includes an ink comprising metallic ink particles, which create a metallic appearance; or
- wherein the first and second functional effect inks include fluorescent, luminescent, phosphorescent inks, photochromic, thermochromic, hydrochromic, or peizochromic inks.

2. The printed security feature according to claim 1, wherein the first functional effect ink is printed as a solid strip, and the second functional effect ink is printed as patterns.

3. The printed security feature according to claim 2, wherein the second functional effect ink is printed within boundaries of the solid strip formed by the first functional effect ink, that is, the patterns are printed such that they substantially overlap with the strip formed by the first functional effect ink, or wherein the second functional effect ink is printed such that it extends beyond boundaries of the solid strip formed by the first functional effect ink, wherein portions of the second functional effect ink which extend beyond the boundaries of the solid strip are configured as a shadow image visible in transmission.

4. The printed security feature according to claim 1, wherein at least one of the first functional effect ink and the second functional effect ink includes a colour switching ink, which displays a variable colour appearance when a viewing condition and/or a viewing angle changes, or wherein at least one of the first functional effect ink and the second functional effect ink includes an ink comprising metallic ink particles, which create a metallic appearance.

5. The printed security feature according to claim 1, further comprising a non-functional effect ink printed on the substrate in one or more ink layers, and on one or both surfaces of the substrate, wherein non-functional effect ink is printed to coat a major area of the first and second surfaces of the substrate, to produce a printing surface for subsequent security features applied to the substrate, and further wherein the non-functional effect ink is omitted in one or more regions where the first and the second functional effect ink have already been applied, wherein within the one or more regions, the security feature displays a glossy surface appearance, and effects of the first and second functional effect inks are perceivable to an observer through the one or more regions where the non-functional effect ink is omitted, wherein outside the one or more regions, the security feature displays a matt appearance, and effects of the first and second functional effect inks are partially concealed by the non-functional effect ink, and wherein the glossy appearance and the matt appearance of the security feature are more easily distinguishable from each other at oblique viewings, and when the security feature is viewed in reflection; wherein the glossy appearance and the matt appearance of the security feature are less distinguishable from each other at non-oblique viewing angles, or when the security feature is viewed in transmission.

6. The printed security feature according to claim 5, wherein the first functional effect ink and the second functional effect inks are both printed on the first surface of the substrate, and the non-functional effect ink is also applied on the first surface of the substrate.

7. The printed security feature according to claim 5, wherein the non-functional effect ink is applied in one or more ink coating layers, to form a shadow image visible from the second surface of the substrate, wherein the shadow image is observable in reflection, but becomes less observable in transmission, and further wherein the shadow image is formed as a negative shadow image, that is, the non-functional effect ink is omitted in accordance with a design of the shadow image, or the shadow image is formed as a positive shadow image, that is, the non-functional effect ink is printed such that more ink is deposited in areas where the positive shadow image is formed.

8. The printed security feature according to claim 5, wherein the substrate is a transparent or translucent substrate made from a polymeric material, or wherein the security document is a polymeric banknote substrate.

9. The printed security feature according to claim 5, wherein the first and second functional effect ink, and the non-functional effect ink are all applied in an in-line printing process.

10. The printed security feature according to claim 1, wherein the security feature extends a partial distance between the first edge and the second edge, or an entire distance between the first edge and the second edge of the security document, wherein the first and the second edges are parallel.

11. The security feature of claim 1, wherein the security feature is configured to provide a shadow image that is visible in transmission or reflection.

12. The security feature of claim 1, wherein at least one of the first functional effect ink and the second functional effect ink is configured to provide a shadow image that is visible in transmission or reflection.

13. A printed security feature for a security document, said security document including a transparent or translucent substrate of polymeric material, the security feature comprising:

a first functional effect ink printed directly onto a first surface of the substrate;

a second functional effect ink printed directly onto the first and/or a second surface of the substrate, at least partially overlapping the first functional effect ink, and a non-functional effect ink printed in one or more ink layers to create a shadow image which is observable in reflection or transmission, wherein the first and the second functional effect inks in combination create an imagery appearance of a security thread that is an elongate strip having a length that is greater than its width and extends between a first edge and a second edge of the security document, wherein at least one of the first functional effect ink and the second functional effect ink includes a colour switching ink, which displays a variable colour appearance when a viewing condition and/or a viewing angle changes, or wherein at least one of the first functional effect ink and the second functional effect ink includes an ink comprising metallic ink particles, which create a metallic appearance or wherein the first and second functional effect inks include fluorescent, luminescent, phosphorescent inks, photochromic, thermochromic, hydrochromic, or peizochromic inks.

14. The security feature of claim 13, wherein the first and second functional effect inks in combination create an imagery appearance of a security thread.

15. The security feature of claim 14, wherein the security feature is of an elongate configuration which extends a partial distance between a first end and a second edge of the security document that are parallel, or an entire distance between the first and the second edge of the security document, wherein the first and the second edges are parallel.

16. The security feature of claim 13, wherein the security feature is a security thread that is configured such that it displays a glossy, or a brighter visual appearance in some regions, and a less glossy, or a duller visual appearance in other regions, and is at least partially embedded in the substate.

17. The security feature of claim 13, wherein the first functional effect ink is printed as a solid strip, and the second functional effect ink is printed as patterns.

18. The security feature of claim 17, wherein second functional effect ink is printed such that it appears as a second shadow image visible in transmission and visible from both sides of the security document.

19. The security feature of claim 13, wherein the non-functional effect ink is also printed on the substrate in one or more ink layers, and on one or both surfaces of the substrate, and the non-functional effect ink is omitted in one or more regions where the first and the second functional effect ink have already been applied.

20. The security feature of claim 19, wherein within the one or more regions, the security feature displays a glossy surface appearance, and effects of the first and second functional effect inks are perceivable to an observer through the one or more regions where the non-functional effect ink is omitted; wherein outside the one or more regions, the security feature displays a matt appearance, and effects of the first and second functional effect inks are partially concealed by the non-functional effect ink, and wherein the glossy appearance and the matt appearance of the security feature are more easily distinguishable from each other at oblique viewings, and when the security feature is viewed in reflection; wherein the glossy appearance and the matt appearance of the security feature are less distinguishable from each other at other viewing angles, such as from non-oblique viewings, or when the security feature is viewed in transmission.

21. The security feature of claim 13, wherein the shadow image is formed as a negative shadow image, that is, the non-functional effect ink is omitted in accordance with a design of the shadow image; or the shadow image is formed as a positive shadow image, that is, the non-functional effect ink is printed such that more ink is deposited in areas where the positive shadow image is formed.

* * * * *